Patented May 17, 1938

2,117,682

UNITED STATES PATENT OFFICE 2,117,682

CHOCOLATE MILK PRODUCT AND METHOD OF MAKING THE SAME

Filip Leon Sanna, Madison, Wis.

No Drawing. Application November 1, 1937, Serial No. 172,291

8 Claims. (Cl. 99—25)

This invention is directed to a product and method of producing a chocolate milk powder designed primarily to be formulated into a drink known as chocolate milk.

The primary object of the present invention is to produce a product which may be made into chocolate ice cream, chocolate malt freeze, or chocolate milk, in which no fibre specks will be visible and which will be of substantially improved color, body and flavor and in which the chocolate or its equivalent will not settle out.

The method may be carried out with either of two primary steps, both of which appear to have substantially the same effect, at least for the purposes of the present invention.

In a method utilizing the first of said steps, skim milk is heated to 195° F. and while at this temperature, acid, preferably hydrochloric acid, is added to reduce the pH of the mass to 4.5 and at the same time effect a complete precipitation of the proteins.

The mass is held at this temperature and under these conditions for approximately 60 minutes, during which time there is effected a partial peptonization of the proteins and a partial inversion of the milk sugar.

This is a primary step in developing the colloidal power of the milk solids. For this time period of 60 minutes and while maintaining the mass at the same temperature, a low-fat or fat-free cocoa is added.

In the alternative step of treating the skim milk up to this point, the skim milk is heated to approximately 106° F. and while at this temperature, an enzyme, such for example as rennet, is added to effect a complete precipitation of the casein. Following the complete precipitation of the casein, the mass is then heated to 195° F. and a low-fat or fat-free cocoa is added.

Following the use of either of the steps above specifically referred to, the amount of cocoa added is preferably such as to equal the volume of the milk solids. The cocoa is evenly distributed throughout the mass and at the previously noted temperature of 195° F., sodium hydroxide is added to bring the pH of the mass up to 8.5. The mass is maintained under the temperature noted and the conditions defined for a period of approximately 90 minutes.

During this period the mass becomes thickened under the temperature and the action of the sodium hydroxide is such as to render soluble the proteins, decompose the lactose, and to either destroy or dissolve the cocoa fibre. The alkali also serves to make the chocolate much darker and experience proves that the flavor is also materially improved.

While still maintaining the mass at the temperature noted and under the conditions incident to the various steps referred to, the mass is emulsified through a homogenizer. The product then may be subjected to any of the well known methods of dehydrating.

The improved chocolate milk powder is designed to be cold water soluble and fibre free, with materially improved flavor. The product requires no further cooking, and is ready to be used in cold solutions and in preparations of chocolate ice cream, chocolate malt freeze, and chocolate milk.

In the commercial use of this product it is advocated that in the use of chocolate ice cream equal parts of the dry chocolate product and sugar be mixed together, and then added to the freezer at the time of freezing.

In preparation of a connection of malt-freeze, the chocolate product is mixed with malted milk or malted skim milk with sufficient sugar to suit the taste and added to a cold solution of water, skim milk, milk, cream, or ice cream mix, to prepare a chocolate drink 4% to 6% by weight of the chocolate powder with sufficient sugar added to skim milk, partially de-fatted milk, or whole milk.

The chocolate products above mentioned thus produced, have a substantially improved color, body and flavor, and present a uniform product free from fibre.

It is believed and undoubtedly true that the proteins of the milk function as stabilizers to a degree sufficient to prevent the settling out of the cocoa.

In the initial step as above described wherein lactic acid is used to precipitate in the place of the hydrochloric acid, as is contemplated, and also productive of desired results, the alkali in the place of the sodium hydroxide referred to should be calcium hydroxide. In this use of lactic acid and calcium hydroxide, a calcium lactate is formed which is believed to be available to the human body and highly nutritious.

What is claimed to be new is:

1. A method of producing a chocolate milk powder, consisting in subjecting skim milk to heat, precipitating the casein therein, maintaining the heat condition of the mass while adding a low-fat cocoa, adding an alkali to bring the pH of the mass to substantially 8.5, maintaining the heat condition for a sufficient period to cause the mass to thicken, the precipitated proteins to become soluble and the lactose to be decomposed, and emulsifying the mass through a homogenizer.

2. A method of producing a chocolate milk powder, consisting in subjecting skim milk to a temperature of approximately 195° F., reducing the pH of the mass to 4.5 while effecting a complete precipitation of the casein, maintaining the mass at the stated temperature for a sufficient period to effect a partial peptonization of the proteins and a partial inversion of the milk sugar, maintaining the mass under these conditions for a definite period during which a low-fat cocoa is added, raising the pH of the mass to approximately 8.5 while maintaining the temperature, and holding the mass at this temperature for a sufficient period to render the precipitated proteins soluble, decompose the lactose, and effect a reddish coloring of the mixture.

3. A method as defined in claim 2, with the additional step of emulsifying the mass and separating the insoluble cocoa fibre.

4. A method as defined in claim 2, wherein the mass is emulsified, the insoluble cocoa fibres separated, and the mass dehydrated.

5. A method of making a chocolate milk powder, consisting in subjecting skim milk to a temperature of approximately 106° F., adding an enzyme to effect a substantially complete precipitation of the casein, increasing the temperature of the mass to approximately 195° F., adding a low-fat cocoa, adding an alkali to bring the pH of the mass to approximately 8.5 while maintaining the temperature of 195° F., maintaining the mass at the temperature noted for approximately 90 minutes to render the precipitated proteins soluble, decompose the lactose, and effect a reddish coloring of the milk sugar, emulsifying the mass while maintaining the temperature, removing the insoluble cocoa fibres, and dehydrating the mass.

6. A method as defined in claim 5, wherein the volume of cocoa added is substantially equal to the volume of the milk solids of the mass.

7. A chocolate milk powder containing casein of skim milk in mixture with cocoa in substantial equal volume with the milk solids with a pH of substantially 8.5.

8. A method of making a chocolate milk powder, consisting in subjecting skim milk to a temperature of approximately 195° F., adding hydrochloric acid to reduce the pH of the mass to substantially 4.5 and effect a precipitation of the casein, maintaining the mass without treatment at the temperature noted for a sufficient time period to effect a partial peptonization of the proteins and a partial inversion of the milk sugar, maintaining the temperature noted, and adding a low-fat cocoa, maintaining the temperature noted, and adding sodium hydroxide to bring the pH of the mass to substantially 8.5, maintaining the mass for a period sufficient as to render soluble the precipitated proteins, decompose the lactose, and effect a reddish coloring of the milk sugar, emulsifying the mass without changing the temperature, removing the insoluble cocoa fibres, and finally dehydrating.

FILIP LEON SANNA.